United States Patent
Han et al.

(10) Patent No.: US 9,492,894 B2
(45) Date of Patent: Nov. 15, 2016

(54) FLUX-CORED ARC WELDING WIRE FOR PROVIDING SUPERIOR TOUGHNESS AND WELDABILITY TO A WELDED JOINT AT A LOW TEMPERATURE, AND WELDED JOINT USING SAME

(75) Inventors: Il-Wook Han, Pohang-si (KR); Bong-Keun Lee, Pohang-si (KR); Jeong-Kil Kim, Pohang-si (KR); Hong-Kil Lee, Pohang-si (KR)

(73) Assignee: POSCO, Pohang-si (KR)

( * ) Notice: Subject to any disclaimer, the term of this patent is extended or adjusted under 35 U.S.C. 154(b) by 379 days.

(21) Appl. No.: 13/997,725

(22) PCT Filed: Dec. 27, 2011

(86) PCT No.: PCT/KR2011/010160
§ 371 (c)(1),
(2), (4) Date: Jun. 25, 2013

(87) PCT Pub. No.: WO2012/091413
PCT Pub. Date: Jul. 5, 2012

(65) Prior Publication Data
US 2013/0284713 A1   Oct. 31, 2013

(30) Foreign Application Priority Data
Dec. 27, 2010 (KR) .................. 10-2010-0136116

(51) Int. Cl.
*B23K 35/362* (2006.01)
*B23K 9/173* (2006.01)
*B23K 35/02* (2006.01)
*B23K 35/30* (2006.01)
*C22C 38/00* (2006.01)
*C22C 38/02* (2006.01)
(Continued)

(52) U.S. Cl.
CPC ............. *B23K 35/362* (2013.01); *B23K 9/173* (2013.01); *B23K 35/0266* (2013.01); *B23K 35/3053* (2013.01); *B23K 35/3066* (2013.01); *B23K 35/3073* (2013.01); *B23K 35/3093* (2013.01);
(Continued)

(58) Field of Classification Search
CPC ............. B23K 35/0266; B23K 35/22; B23K 35/3053; B23K 35/3602; B23K 35/3605; B23K 9/173
USPC ..................................... 219/145.22
See application file for complete search history.

(56) References Cited

U.S. PATENT DOCUMENTS

| 5,296,677 A | 3/1994 | Takahashi et al. |
| 2006/0065335 A1 | 3/2006 | Mizutani et al. |
| 2011/0139761 A1* | 6/2011 | Sugahara ........... B23K 35/0266 219/145.22 |

FOREIGN PATENT DOCUMENTS

| CN | 101104232 A | 1/2008 |
| CN | 101157164 A | 4/2008 |

(Continued)

OTHER PUBLICATIONS

Machine Translation of JP 2008-087043 performed on Jul. 6, 2015.*

*Primary Examiner* — Brian Jennison
(74) *Attorney, Agent, or Firm* — The Webb Law Firm (57) ABSTRACT

Provided are a flux cored arc welding wire able to improve low-temperature toughness of a weld joint and a weld joint using the same, in which the flux cored arc welding wire includes 0.01 wt % to 0.1 wt % of carbon (C), 0.3 wt % to 1.4 wt % of silicon (Si), 1.0 wt % to 3.0 wt % of manganese (Mn), 4.0 wt % to 7.5 wt % of titanium (Ti)+TiO, 0.01 wt % to 3.0 wt % of nickel (Ni), 0.01 wt % to 0.2 wt % of boron (B), 0.02 wt % to 0.42 wt % of yttrium (Y) or 0.02 wt % to 0.56 wt % of a rare earth metal (REM), and iron (Fe) as well as other unavoidable impurities as a remainder.

10 Claims, 3 Drawing Sheets

(51) Int. Cl.
    *C22C 38/04*     (2006.01)
    *C22C 38/08*     (2006.01)
    *C22C 38/14*     (2006.01)
    *B23K 35/36*     (2006.01)
    *B23K 35/368*     (2006.01)

(52) U.S. Cl.
    CPC ............ *B23K 35/36* (2013.01); *B23K 35/368* (2013.01); *C22C 38/00* (2013.01); *C22C 38/002* (2013.01); *C22C 38/005* (2013.01); *C22C 38/02* (2013.01); *C22C 38/04* (2013.01); *C22C 38/08* (2013.01); *C22C 38/14* (2013.01); *C21D 2211/005* (2013.01); *Y10T 403/479* (2015.01)

(56) References Cited

FOREIGN PATENT DOCUMENTS

| | | |
|---|---|---|
| EP | 0688630 A1 | 12/1995 |
| EP | 1707303 A1 | 10/2006 |
| JP | 46-15005 | 4/1971 |
| JP | 59-047087 | 3/1984 |
| JP | 03-294096 | 12/1991 |
| JP | 4-339591 | 11/1992 |
| JP | 05-269593 A | 10/1993 |
| JP | 810982 A | 1/1996 |
| JP | 11170085 A | 6/1999 |
| JP | 2000-141085 | 5/2000 |
| JP | 2004043961 A | 2/2004 |
| JP | 2006281223 | 10/2006 |
| JP | 2008126262 A | 6/2008 |
| JP | 2010-269335 | 12/2010 |
| JP | 2010274304 A | 12/2010 |
| JP | 2011-507707 | 3/2011 |
| JP | 2011-245519 | 12/2011 |
| JP | 2012-115878 | 6/2012 |
| KR | 100833048 B1 | 5/2008 |
| KR | 1020090026070 A | 3/2009 |
| KR | 10-2010-0059269 A | 6/2010 |
| KR | 1020100074940 A | 7/2010 |
| WO | 2009/082162 A2 | 7/2009 |

\* cited by examiner

FLUX-CORED ARC WELDING WIRE FOR PROVIDING SUPERIOR TOUGHNESS AND WELDABILITY TO A WELDED JOINT AT A LOW TEMPERATURE, AND WELDED JOINT USING SAME

TECHNICAL FIELD

The present invention relates to a flux cored arc welding (FCAW) wire used during flux cored arc welding of marine structures, within the energy industry, in shipbuilding, in construction, in constructing bridges, or pressure vessels, and a weld joint using the same.

BACKGROUND ART

Recently, relatively large ships, buildings, marine structures and the like have been constructed, and simultaneously, areas of application thereof have been expanded to regions of extreme cold or deep-sea regions. Since the above structures may cause catastrophic damage to the environment, as well as the loss of life and property, in a single accident, steels having high degrees of strength, extra thickness, and high low-temperature toughness have been used for such structures and vessels.

Sound, efficient welding is required along with the development of such steels, and a flux cored arc welding (FCAW) technique is a welding technique that is most widely used as a method of welding such steels.

The most widely used steels for the above structures include steels having a yield point (YP) ranging from 320 MPa to 420 MPa and a yield strength (YS) ranging from 460 MPa to 560 MPa, and weld joints of the steels must exhibit the same or better properties in comparison to base metals. In the case of being used in regions of extreme cold, the steels must also exhibit high degrees of low-temperature toughness (low-temperature impact toughness, crack tip opening displacement (CTOD)) of weld joints, while satisfying the above properties.

In general, with respect to a joint formed during welding, a portion of steel is diluted to form a melt pool, while welding materials are melted and the melt pool is subsequently solidified to become a coarse columnar structure. The structure thereof may be changed according to the welding materials and a heat input during welding. Since coarse grain boundary ferrite, Widmanstätten ferrite, martensite, and martensite austenite (M-A) constituents may be formed in coarse austenite grain boundaries of weld joints, impact toughness thereof may deteriorate significantly.

Therefore, with respect to welding materials for marine structures, refinements of welded metal structures have been pursued through the complex addition of alloying elements, such as nickel (Ni), titanium (Ti), and boron (B), along with the addition of deoxidizing, denitrifying, or dehydrogenating elements, in order to secure low-temperature Charpy impact toughness within a temperature range of about −40° C. to about −80° C. Means for improving weld toughness by the complex addition of Ti—B—Ni were developed in the early 1980s in order to meet the need for improving toughness characteristics, such as CTOD, have been commercialized, and are currently being used in various welding materials having an YP of about 550 MPa or less.

However, a mechanism for structural refinement by the complex addition of Ti-B-Ni may include matrix toughening by Ni, the inhibition of pro-eutectoid ferrite formation due to prior austenite grain boundary segregation of dissolved B, and the generation of fine ferrite in austenite grains caused by Ti, B, oxides, and nitrides.

As described above, there is a need to secure impact toughness of a weld joint by controlling the microstructure of the weld joint in order to secure stability of a welded structure. For this purpose, techniques regulating compositions of welding materials, for example, were disclosed in Japanese Patent Application Laid-Open Publication Nos. H8-10982 and H11-170085. However, since the above inventions may not control microstructures and grain diameters of welded metals, it may be difficult to secure sufficient and stable toughness of weld joints prepared with the above welding materials. Also, since changes in microstructures and compositions of weld joints may inevitably occur as heat input during welding work is changed by an amount ranging from about 0.8 kJ/mm to about 2.7 kJ/mm, it may be more difficult to secure toughness in weld joints.

Since the flux cored arc welding uses carbon dioxide gas as a protective gas during welding, it may be more economical than the case of using argon gas. However, arcs may be unstable and a decrease in welding workability, such as frequent occurrence of a spatter phenomenon in which fine particles are scattered around during welding, may occur.

SUMMARY OF THE INVENTION

An aspect of the present invention provides a flux cored arc welding wire able to improve workability and able to secure low-temperature toughness of a weld joint by reducing an amount of spatter generated, and a weld joint using the same.

According to an aspect of the present invention, there is provided a flux cored arc welding wire having excellent workability and able to secure low-temperature toughness of a weld joint including: 0.01 wt % to 0.1 wt % of carbon (C); 0.3 wt % to 1.4 wt % of silicon (Si); 1.0 wt % to 3.0 wt % of manganese (Mn); 4.0 wt % to 7.5 wt % of titanium (Ti)+TiO; 0.01 wt % to 3.0 wt % of nickel (Ni); 0.01 wt % to 0.2 wt % of boron (B); 0.02 wt % to 0.42 wt % of yttrium (Y) or 0.02 wt % to 0.56 wt % of a rare earth metal (REM); and iron (Fe) as well as other unavoidable impurities as a remainder.

According to another aspect of the present invention, there is provided a weld joint having excellent workability and able to secure low-temperature toughness including: 0.01 wt % to 0.1 wt % of C; 0.1 wt % to 0.5 wt % of Si; 0.5 wt % to 2.0 wt % of Mn; 0.02 wt % to 0.1 wt % of Ti; 0.01 wt % to 3.0 wt % of Ni; 5 ppm to 60 ppm of B; one or two of 5 ppm to 250 ppm of Y and 5 ppm to 250 ppm of a REM; and Fe as well as other unavoidable impurities as a remainder.

According to an aspect of the present invention, a weld joint having excellent low-temperature impact toughness and low-temperature crack tip opening displacement (CTOD) characteristics as well as high strength physical properties may be provided, and simultaneously, welding workability may be improved by reducing an amount of spatter generated during welding.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Hereinafter, the present invention will be described in detail.

[Welding Wire]

First, a welding wire of the present invention will be described in detail. A flux cored arc welding wire of the present invention includes the following composition, in terms of weight percentage (hereinafter, wt %).

A content of carbon (C) may be in a range of 0.01% to 0.1%.

C is an essential element for securing strength of a weld joint and weld hardenability, and may be added in an amount of 0.01% or more. However, in the case that the content thereof is greater than 0.1%, weldability may greatly decrease, low-temperature cracks in the weld joint may be facilitated, and impact toughness may greatly decrease.

A content of silicon (Si) may be in a range of 0.3% to 1.4%.

In the case that the content of Si is less than 0.3%, a deoxidizing effect in a weld joint may be insufficient and fluidity of the weld joint may be reduced. The case in which the content thereof is greater than 1.4% may not be desirable, because transformation of martensite austenite (M-A) constituents in the weld joint may be promoted to reduce low-temperature impact toughness and to adversely affect weld cracking susceptibility.

A content of manganese (Mn) may be in a range of 1.0% to 3.0%.

Mn in steels may effectively deoxidize the steels and improve strength, and may secure strength and toughness by forming a substitutional solid solution in a matrix structure to solid solution strengthen the matrix. For this purpose, Mn may be contained in an amount of 1.0% or more. However, in the case that the content thereof is greater than 3.0%, it may not be desirable because a low-temperature transformation structure may be formed.

A content of titanium (Ti) may be in a range of 0.001% to 0.3%, in which a content of Ti+$TiO_2$ may be in a range of 4.0% to 7.5%. Since Ti combines with oxygen (O) to form fine TiO—(Ti,B)N complex oxide in a weld joint, i.e., welded metal, it is an inevitable element in the present invention. Also, in order to obtain fine TiO and effective TiN complex precipitates, the content of Ti added may be 0.001% or more and the content of Ti+$TiO_2$ added may be 4.0% or more. However, in the case that the content of Ti is greater than 0.3% and the content of Ti+$TiO_2$ is greater than 7.5%, it may not be desirable because coarse Ti oxide and coarse TiN precipitates may be formed.

A content of nickel (Ni) may be in a range of 0.01% to 3.0%.

Ni is an effective element for improving strength and toughness of a matrix by solid solution strengthening. The content of Ni may be 0.01% or more. However, in the case in which the content thereof is greater than 3.0%, it may not be desirable because hardenability may be greatly increased and high-temperature cracks may be generated.

A content of boron (B) may be in a range of 0.01% to 0.2%.

B is an element that improves hardenability, in which 0.01% or more of B is required for inhibiting grain boundary ferrite transformation by being segregated at grain boundaries. However, in the case that the content thereof is greater than 0.2%, it may not be desirable because the effect thereof may be saturated and weld hardenability may greatly increase to promote martensitic transformation, and thus, low-temperature weld cracks may be generated and toughness may be decreased. Therefore, the content of B may be limited to a range of 0.01% to 0.2%.

The present invention may include yttrium (Y) in an amount ranging from 0.02% to 0.42% or a rare earth metal (REM) in an amount ranging from 0.02% to 0.56%. Y and the REM may act as strong deoxidizers during welding and may act as nucleation sites for primary δ-ferrite by increasing stability of Ti oxide generated during welding as well as increasing the number of oxides while decreasing a size thereof, and thus, Y and the REM may decrease a size of the primary ferrite. Therefore, Y and the REM may decrease a size of prior austenite to increase toughness and strength.

Also, Y and the REM may mainly act to inhibit the generation of grain boundary ferrite by promoting the formation of acicular ferrite as well as increasing an amount of grain boundary segregation of B. In other words, Y and the REM may increase strength through the size reduction of prior austenite, the increase in the fraction of acicular ferrite, and the control of grain boundary ferrite, and simultaneously, may increase toughness at extremely low temperatures (−40° C. to −60° C.). As a result, impact and CTOD characteristics at extremely low temperatures (−40° C. to −60° C.) may be improved.

Furthermore, in the case that Y and the REM are added, Y and the REM may increase the stability of an arc. Since Y and REM facilitate electron emission and constantly maintain current and voltage during welding by allowing oxides stable at high temperatures to form stable cathode spots, an arc may be constant. As a result, Y and the REM may also act to secure good welding workability by minimizing an amount of spatter generated during welding as well as maintaining a constant bead size during welding.

For this purpose, Y may be included in an amount ranging from 0.02% to 0.42% or the REM may be included in an amount ranging from 0.02% to 0.56%. In the case that both Y and REM are included, a sum of the Y and the REM included, for example, may be in a range of 0.19% to 0.65%.

In addition to the foregoing composition, the following components may further be included in order to further improve the characteristics of the present invention.

The present invention may include niobium (Nb) in an amount of 0.15% or less. Nb is an element required for forming fine Nb(C,N) precipitates in a weld joint. However, in the case that a content of Nb in the welding wire is greater than 0.15%, Nb may adversely affect toughness of the weld joint by promoting the formation of grain boundary ferrite in the weld joint and forming a hardening phase, such as carbide, in a welded metal part. Therefore, the content of Nb added may be limited to 0.15% or less in view of the design of the welding wire.

The composition includes iron (Fe) as well as other unavoidable impurities as a remainder.

The welding wire of the present invention may improve welding workability by reducing the amount of spatter generated. The welding wire of the present invention satisfies an amount of spatter of 2.0 mg/min or less generated during arc welding under welding conditions of 280 A-30V.

[Weld Joint]

Hereinafter, a weld joint prepared using the wire of the present invention will be described in detail. The weld joint of the present invention includes the following composition, in terms of weight percentage (hereinafter, wt %).

A content of C may be in a range of 0.01% to 0.1%.

C is an essential element for securing strength of welded metal and weld hardenability, and may be included in an amount of 0.01% or more. However, in the case that the content thereof is greater than 0.1%, weldability may greatly decrease, low-temperature cracks in a weld joint may be facilitated, and impact toughness may greatly decrease. Therefore, the content of C is limited to a range of 0.01% to 0.1%.

A content of Si may be in a range of 0.1% to 0.5%.

In the case that the content of Si is less than 0.1%, strength is difficult to be secured due to the reduction of hardenability. In the case in which the content thereof is greater than 0.5%, it may not be desirable because transformation of M-A constituents in welded metal may be promoted to reduce toughness, such as low-temperature impact toughness, and to increase weld cracking susceptibility.

A content of Mn may be in a range of 0.5% to 2.0%.

Mn is an austenite forming element in steels, and may effectively improve toughness of a welded zone and may secure toughness and strength by being dissolved in a matrix. For this purpose, Mn may be contained in an amount of 0.5% or more. However, in the case that the content thereof is greater than 2.0%, it may not be desirable because low-temperature transformation structure may be formed.

A content of Ni may be in a range of 0.01% to 3.0%.

Ni is an effective element for improving strength and toughness of a matrix by solid solution strengthening. The content of Ni may be 0.01% or more. However, in the case in which the content thereof is greater than 3.0%, it may not be desirable because hardenability may be greatly increased and high-temperature cracks may be generated.

A content of Ti may be in a range of 0.02% to 0.1%.

Since 0.02% or more of Ti combines with O or nitrogen (N) during welding to form fine TiO—(Ti,B)N complex oxide in a weld joint, i.e., welded metal, it is an inevitable element in the present invention. In particular, a predetermined amount of Ti is required in order to obtain fine TiO, effective nucleation sites for forming fine acicular ferrite in austenite grains during solidification. However, in the case that the content of Ti is greater than 0.1%, coarse Ti oxides and coarse TiN precipitates may be formed to reduce low-temperature toughness and fracture toughness.

A content of B may be in a range of 5 ppm to 60 ppm.

B is an element that improves hardenability, in which 5 ppm or more of B is required for inhibiting grain boundary ferrite transformation by being segregated at grain boundaries. However, in the case that the content thereof is greater than 60 ppm, it may not be desirable because the effect thereof may be saturated and weld hardenability may greatly increase to promote martensitic transformation, and thus, low-temperature weld cracks may be generated and toughness may be decreased. Therefore, the content of B may be limited to a range of 5 ppm to 60 ppm.

The weld joint of the present invention may include one or two of 5 ppm to 250 ppm of Y and 5 ppm to 250 ppm of a REM. Y and REM are elements having a very high oxygen affinity and preferentially oxidized in welded metal of the weld joint to form a very stable oxide. The stable oxide may inhibit the generation of grain boundary ferrite by being segregated at grain boundaries in the weld joint and may promote the generation of acicular ferrite. For this purpose, contents of Y and REM may be in a range of 5 ppm to 250 ppm, respectively.

In addition to the above composition, the weld joint of the present invention may further include 0.02% or less of Nb. Nb is an element that may increase strength by being precipitated as a precipitate phase, such as NbC, in the weld joint. However, in the case that a content of Nb is greater than 0.02%, Nb may adversely affect low-temperature toughness due to an increase in the precipitate phase. Therefore, the content of Nb may be limited to 0.02% or less.

The composition includes Fe as well as other unavoidable impurities as a remainder.

The weld joint of the present invention includes complex inclusions formed of one or more of Ti, Mn, Y, and the REM, in which an amount of complex inclusions having an average diameter ranging from 0.01 μm to 0.1 μm may be 65% or less of total complex inclusions. The complex inclusions in the weld joint act as nucleation sites to promote the generation of acicular ferrite. However, fine inclusions, i.e., complex inclusions having an average diameter ranging from 0.01 μm to 0.1 μm, do not act as nucleation sites during the generation of the acicular ferrite, and when the amount of the fine inclusions increases, the fine inclusions may act as a fracture origin at low temperatures to adversely affect fracture toughness. Therefore, the amount of the complex inclusions having an average diameter ranging from 0.01 μm to 0.1 μm may be 65% or less of the total complex inclusions.

Also, the number of complex inclusions having an average diameter of 1 μm or more may be 200 or more per 1 $mm^2$. A high level of inclusions is inevitably introduced into the weld joint in order to secure all-position weldability of the flux cored welding material. The inclusions may act as the nucleation sites of acicular ferrite to promote the generation of the acicular ferrite. In order to satisfy the above level, the number of the inclusions having an average diameter of 1 μm or more may be 200 or more per 1 $mm^2$.

A diameter of the prior austenite in the weld joint of the present invention may be 400 μm or less. In general, a size of ferrite generated at room temperature is linked with a size of the prior austenite. That is, the size of finally generated ferrite decreases as the size of the prior austenite decreases. As a result, the number of grain boundaries increases and the grain boundaries may delay a phenomenon of fracturing during a low-temperature CTOD test. Therefore, since the prior austenite may insufficiently delay the low-temperature fracture when the diameter of the prior austenite is greater than 400 μm, the diameter of the prior austenite may be 400 μm or less.

A microstructure of the weld joint of the present invention may include acicular ferrite having an area fraction of 86% or more. The acicular ferrite is a structure that may simultaneously increase strength and low-temperature toughness in the weld joint. Also, in the case that the fraction of the acicular ferrite increases, a temperature range, in which toughness may be secured, may decrease. Therefore, 86% of more of acicular ferrite may be structurally included in order to secure excellent low-temperature toughness at −40° C., −60° C., and −80° C.

The weld joint of the present invention satisfies a low-temperature impact toughness (Charpy V-notch (CVN)) at −80° C. of 60 J or more and a low-temperature CTOP value at −60° C. of 0.25 mm or more, and thus exhibits excellent low-temperature toughness.

Hereinafter, examples of the present invention will be described in detail.

EXAMPLE 1

Welding wires having compositions of the following Table 1 were prepared and flux cored arc welding was performed with a heat input range of 0.8 kJ/mm to 2.7 kJ/mm under 100% $CO_2$ protective gas by using the above wires.

Compositions of weld joints obtained through the above welding are presented in Table 2. Low-temperature impact toughness and low-temperature CTOD of each weld joint were evaluated and the results thereof are presented in Table 2. The low-temperature impact toughness was evaluated through Charpy impact tests (CVN) using KS Standard (KS B 0801) No. 4 specimens.

Microstructures and inclusions of weld joints were observed and the results thereof are presented in Table 3. The microstructures and the inclusions were measured by using a point counting method using an image analyzer and an electron microscope.

TABLE 1

| Category | C | Mn | Si | Ni | B | Ti + TiO$_2$ | Nb | Y | REM | Heat input (kJ/mm) |
|---|---|---|---|---|---|---|---|---|---|---|
| Inventive Example 1 | 0.02 | 1.32 | 0.30 | 0.1 | 0.014 | 4.12 | 0.02 | 0.07 | 0 | 2.7 |
| Inventive Example 2 | 0.02 | 1.32 | 0.41 | 1.2 | 0.014 | 4.2 | 0.11 | 0.12 | 0 | 2.7 |
| Inventive Example 3 | 0.03 | 1.42 | 0.52 | 0.42 | 0.03 | 7.6 | 0.02 | 0.21 | 0 | 2.7 |
| Inventive Example 4 | 0.04 | 1.42 | 0.52 | 0.42 | 0.03 | 7.6 | 0.1 | 0.42 | 0 | 2.7 |
| Inventive Example 5 | 0.08 | 1.42 | 0.41 | 0.97 | 0.05 | 7.4 | 0.017 | 0 | 0.07 | 2.7 |
| Inventive Example 6 | 0.07 | 1.32 | 0.69 | 0.97 | 0.05 | 7.4 | 0.11 | 0 | 0.12 | 2.7 |
| Inventive Example 7 | 0.09 | 2.12 | 0.72 | 1.45 | 0.08 | 6.8 | 0.015 | 0 | 0.56 | 2.7 |
| Inventive Example 8 | 0.1 | 2.13 | 0.83 | 1.45 | 0.09 | 6.8 | 0.13 | 0 | 0.42 | 2.7 |
| Inventive Example 9 | 0.04 | 2.9 | 1.20 | 2.2 | 0.12 | 6.8 | 0.02 | 0.07 | 0.56 | 2.7 |
| Inventive Example 10 | 0.04 | 3.0 | 1.30 | 2.9 | 0.03 | 6.8 | 0.12 | 0.42 | 0.21 | 2.7 |
| Inventive Example 11 | 0.06 | 2.31 | 0.82 | 1.23 | 0.06 | 4.3 | 0.13 | 0.07 | 0 | 0.8 |
| Inventive Example 12 | 0.07 | 1.22 | 0.41 | 0.45 | 0.03 | 4.2 | 0.11 | 0.12 | 0 | 0.8 |
| Inventive Example 13 | 0.08 | 1.32 | 0.42 | 1.23 | 0.06 | 4.2 | 0.12 | 0.07 | 0 | 1.7 |
| Inventive Example 14 | 0.07 | 1.32 | 0.41 | 0.95 | 0.06 | 4.2 | 0.11 | 0.12 | 0 | 1.7 |
| Inventive Example 15 | 0.06 | 1.32 | 0.41 | 0.45 | 0.06 | 4.2 | 0.11 | 0.21 | 0 | 1.7 |
| Comparative Example 1 | 0.07 | 1.42 | 0.41 | 2.9 | 0.014 | 4.12 | 0.02 | 0 | 0 | 2.7 |
| Comparative Example 2 | 0.09 | 1.32 | 0.52 | 1.45 | 0.014 | 4.2 | 0.11 | 0 | 0 | 1.7 |
| Comparative Example 3 | 0.02 | 1.32 | 0.52 | 0.42 | 0.014 | 7.6 | 0.02 | 0 | 0 | 0.8 |
| Comparative Example 4 | 0.02 | 1.32 | 0.83 | 0.42 | 0.08 | 7.6 | 0.1 | 0.056 | 0 | 2.7 |
| Comparative Example 5 | 0.02 | 1.68 | 0.59 | 0.97 | 0.09 | 7.4 | 0.017 | 0.056 | 0 | 1.7 |
| Comparative Example 6 | 0.03 | 2.12 | 0.59 | 0.97 | 0.12 | 7.4 | 0.11 | 0 | 0.70 | 2.7 |
| Comparative Example 7 | 0.03 | 2.13 | 1.20 | 1.45 | 0.03 | 6.8 | 0.015 | 0.56 | 0 | 0.8 |
| Comparative Example 8 | 0.09 | 1.68 | 0.59 | 1.45 | 0.014 | 6.8 | 0.015 | 0.12 | 0.56 | 2.7 |

TABLE 2

| Category | C | Si | Mn | Ni | Nb | Ti | B | REM | Y | CVN(J/mm²) -40° C. | CVN(J/mm²) -60° C. | CVN(J/mm²) -80° C. | CTOD -40° C. | CTOD -60° C. |
|---|---|---|---|---|---|---|---|---|---|---|---|---|---|---|
| Inventive Example 1 | 0.032 | 0.368 | 1.27 | 1.40 | 0.0026 | 0.048 | 0.0037 | 0 | 0.001 | 151 | 128 | 95 | 0.34 | 0.27 |
| Inventive Example 2 | 0.0378 | 0.3485 | 1.34 | 1.43 | 0.002 | 0.046 | 0.004 | 0 | 0.006 | 157 | 132 | 125 | 0.68 | 0.60 |
| Inventive Example 3 | 0.032 | 0.365 | 1.26 | 1.32 | 0.0025 | 0.047 | 0.0034 | 0 | 0.011 | 161 | 138 | 154 | 1.25 | 1.02 |
| Inventive Example 4 | 0.035 | 0.381 | 1.37 | 1.42 | 0.0029 | 0.052 | 0.0039 | 0 | 0.014 | 158 | 134 | 135 | 0.58 | 0.43 |
| Inventive Example 5 | 0.035 | 0.380 | 1.36 | 1.40 | 0.0026 | 0.050 | 0.0038 | 0.002 | 0 | 157 | 130 | 131 | 0.56 | 0.38 |
| Inventive Example 6 | 0.032 | 0.394 | 1.34 | 1.39 | 0.0021 | 0.049 | 0.0042 | 0.002 | 0 | 158 | 134 | 135 | 0.42 | 0.37 |
| Inventive Example 7 | 0.035 | 0.411 | 1.41 | 1.41 | 0.0032 | 0.051 | 0.0044 | 0.012 | 0 | 160 | 121 | 121 | 0.34 | 0.27 |
| Inventive Example 8 | 0.033 | 0.412 | 1.42 | 1.43 | 0.0034 | 0.052 | 0.0047 | 0.016 | 0 | 154 | 112 | 119 | 0.32 | 0.27 |
| Inventive Example 9 | 0.034 | 0.401 | 1.39 | 1.42 | 0.0032 | 0.053 | 0.0047 | 0.021 | 0.001 | 148 | 121 | 102 | 0.98 | 0.75 |
| Inventive Example 10 | 0.033 | 0.362 | 1.24 | 1.42 | 0.0031 | 0.042 | 0.0037 | 0.016 | 0.002 | 132 | 111 | 81 | 0.42 | 0.28 |
| Inventive Example 11 | 0.032 | 0.468 | 1.55 | 1.47 | 0.004 | 0.095 | 0.0057 | 0 | 0.007 | 104 | 80 | 71 | 0.34 | 0.28 |
| Inventive Example 12 | 0.036 | 0.486 | 1.54 | 1.45 | 0.003 | 0.099 | 0.0058 | 0 | 0.025 | 112 | 87 | 103 | 0.87 | 0.65 |
| Inventive Example 13 | 0.033 | 0.445 | 1.49 | 1.40 | 0.004 | 0.086 | 0.0051 | 0 | 0.002 | 143 | 119 | 108 | 0.25 | 0.28 |
| Inventive Example 14 | 0.033 | 0.443 | 1.49 | 1.41 | 0.004 | 0.088 | 0.0047 | 0 | 0.012 | 148 | 126 | 112 | 0.68 | 0.58 |
| Inventive Example 15 | 0.035 | 0.450 | 1.55 | 1.43 | 0.004 | 0.097 | 0.0051 | 0 | 0.023 | 151 | 129 | 123 | 1.12 | 1.02 |
| Comparative Example 1 | 0.031 | 0.376 | 1.28 | 1.39 | 0.0025 | 0.046 | 0.0036 | 0 | 0 | 94 | 96 | 58 | 0.12 | 0.08 |
| Comparative Example 2 | 0.034 | 0.465 | 1.52 | 1.45 | 0.003 | 0.083 | 0.0053 | 0 | 0 | 98 | 85 | 60 | 0.09 | 0.05 |
| Comparative Example 3 | 0.034 | 0.456 | 1.52 | 1.43 | 0.005 | 0.092 | 0.0056 | 0 | 0 | 92 | 62 | 53 | 0.07 | 0.02 |
| Comparative Example 4 | 0.034 | 0.543 | 1.64 | 1.57 | 0.0034 | 0.103 | 0.0054 | 0 | 0.031 | 112 | 22 | 12 | 0.03 | 0.01 |
| Comparative Example 5 | 0.036 | 0.488 | 1.67 | 1.53 | 0.004 | 0.125 | 0.0056 | 0 | 0.057 | 62 | 17 | 19 | 0.02 | 0.01 |
| Comparative Example 6 | 0.037 | 0.573 | 1.62 | 1.52 | 0.0038 | 0.094 | 0.0052 | 0.042 | 0 | 82 | 23 | 12 | 0.03 | 0.01 |
| Comparative Example 7 | 0.036 | 0.542 | 1.72 | 1.63 | 0.004 | 0.135 | 0.0067 | 0 | 0.102 | 26 | 23 | 18 | 0.01 | 0.01 |
| Comparative Example 8 | 0.039 | 0.432 | 1.54 | 1.47 | 0.0045 | 0.082 | 0.0050 | 0.039 | 0.007 | 135 | 97 | 43 | 0.01 | 0.08 |

TABLE 3

| Category | Grain boundary ferrite (%) | Acicular ferrite (%) | Prior austenite diameter (μm) | Number fraction (%) of inclusions having a diameter ranging from 0.01 to 0.1 μm | Inclusions having a diameter of 1 μm or more per 1 mm² (numbers) |
|---|---|---|---|---|---|
| Inventive Example 1 | 13 | 87 | 321 | 23 | 352 |
| Inventive Example 2 | 12 | 88 | 304 | 34 | 427 |
| Inventive Example 3 | 6 | 94 | 289 | 52 | 463 |
| Inventive Example 4 | 2 | 98 | 265 | 63 | 523 |
| Inventive Example 5 | 14 | 86 | 345 | 25 | 353 |
| Inventive Example 6 | 13 | 87 | 312 | 35 | 424 |
| Inventive Example 7 | 9 | 91 | 283 | 42 | 463 |
| Inventive Example 8 | 2 | 98 | 274 | 54 | 523 |
| Inventive Example 9 | 4 | 96 | 251 | 56 | 423 |
| Inventive Example 10 | 1 | 99 | 235 | 54 | 234 |
| Inventive Example 11 | 12 | 88 | 324 | 32 | 522 |
| Inventive Example 12 | 6 | 94 | 294 | 42 | 334 |
| Inventive Example 13 | 2 | 98 | 285 | 34 | 452 |
| Inventive Example 14 | 3 | 97 | 356 | 42 | 461 |

TABLE 3-continued

| Category | Grain boundary ferrite (%) | Acicular ferrite (%) | Prior austenite diameter (μm) | Number fraction (%) of inclusions having a diameter ranging from 0.01 to 0.1 μm | Inclusions having a diameter of 1 μm or more per 1 mm$^2$ (numbers) |
|---|---|---|---|---|---|
| Inventive Example 15 | 1 | 99 | 293 | 32 | 428 |
| Comparative Example 1 | 24 | 76 | 542 | 73 | 184 |
| Comparative Example 2 | 22 | 78 | 423 | 69 | 192 |
| Comparative Example 3 | 23 | 77 | 582 | 67 | 156 |
| Comparative Example 4 | 26 | 74 | Bainite structure | 57 | 512 |
| Comparative Example 5 | 28 | 72 | Bainite structure | 52 | 442 |
| Comparative Example 6 | 32 | 68 | Bainite structure | 34 | 532 |
| Comparative Example 7 | 31 | 69 | Bainite structure | 42 | 452 |
| Comparative Example 8 | 29 | 71 | Bainite structure | 52 | 427 |

As illustrated in Tables 2 and 3, weld joints satisfying the scope of the present invention, i.e., all inventive examples, had a low-temperature impact toughness at −80° C. of 60 J or more and a low-temperature CTOD value at −60° C. of 0.25 mm or more. Therefore, it may be confirmed that all inventive examples had excellent low-temperature toughness.

In contrast, since Comparative Examples 1 to 3 not including Y or REM had a low fraction of acicular ferrite and coarse prior austenite structures, it may be confirmed that Comparative Examples 1 to 3 did not reach a low-temperature toughness value required in the present invention.

Also, in Comparative Examples 4 to 6 having the content of Y or REM below that required in the present invention and Comparative Examples 7 and 8 having the content of Y or REM that is outside of the range of the present invention, it may be confirmed that fractions of ferrite were not only low, but a bainite structure was also included instead of prior austenite. That is, it may be confirmed that Comparative Examples 4 to 6 did not reach the low-temperature toughness value of the present invention.

Figure 1A:
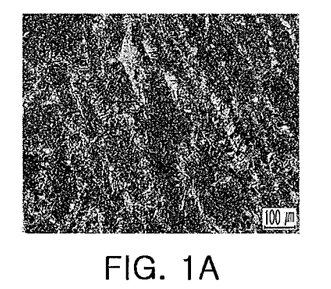
FIGS. 1(a), 1(b), and 1(c) are micrographs respectively illustrating microstructures of Comparative Example 1, Inventive Example 1, and Comparative Example 7.
Figure 1B:
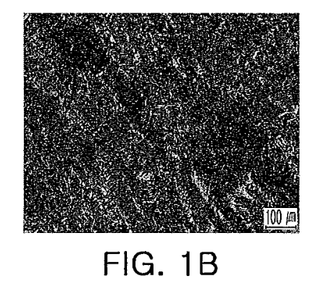
Figure 1C:
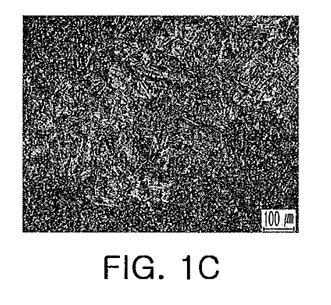

FIGS. 1(a), 1(b), and 1(c) are micrographs respectively illustrating microstructures of Comparative Example 1, Inventive Example 1, and Comparative Example 7. As illustrated in FIG. 1(b), it may be confirmed that most of the microstructure of the inventive example is composed of acicular ferrite, but acicular ferrite was not sufficiently formed in the case that an amount of Y added was insufficient as illustrated in FIG. 1(a). As illustrated in FIG. 1(c), it may be confirmed that bainite, martensite, and M-A structures which adversely affect low-temperature toughness were observed in the case in which Y is excessively added.

Figure 2A:
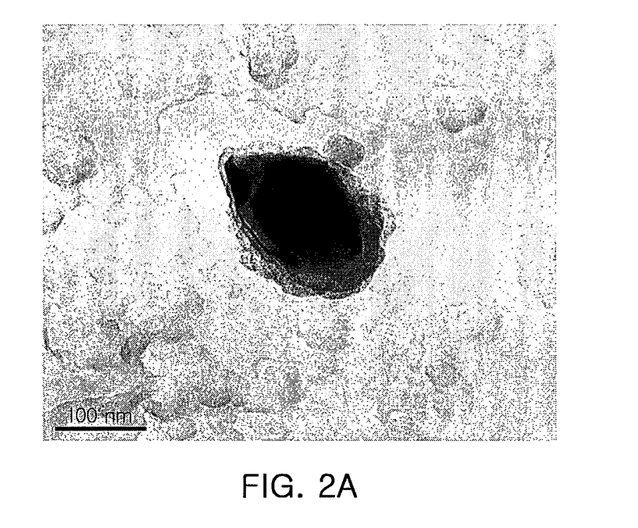
FIG. 2(a) is a micrograph illustrating a complex inclusion of Inventive Example 1.
Figure 2B:
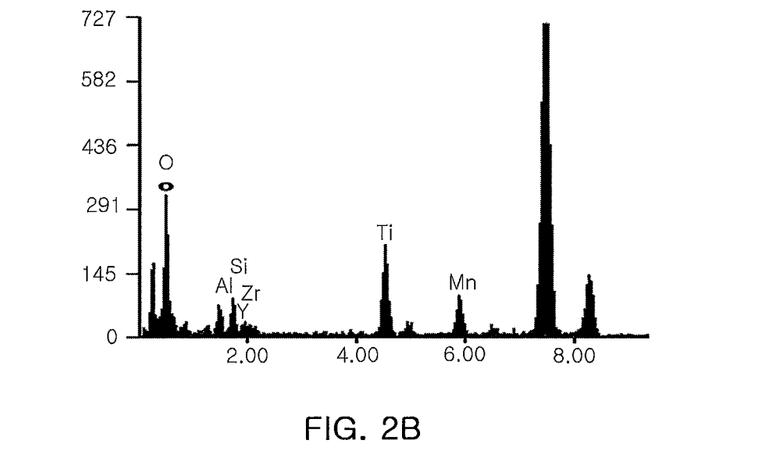
FIG. 2(b) is a graph obtained by energy dispersive X-ray spectroscopy (EDX) of the complex inclusion.

FIG. 2(a) is a micrograph illustrating a complex inclusion of Inventive Example 1, and FIG. 2(b) is a graph obtained by energy dispersive X-ray spectroscopy (EDX) of the complex inclusion. Referring to FIGS. 2(a) and 2(b), it may be confirmed that complex oxide including Y is formed in the weld joint of the present invention.

EXAMPLE 2

In the case of using the flux cored arc welding wire of the present invention, an amount of spatter generated was measured to investigate the improvement of welding workability.

Flux cored welding wires having compositions (wt %) of the following Table 4 were prepared and flux cored arc welding was performed under welding conditions of 280 A-30V. In Table 1, the compositions include Fe as well as other unavoidable impurities as a remainder.

Figure 3:
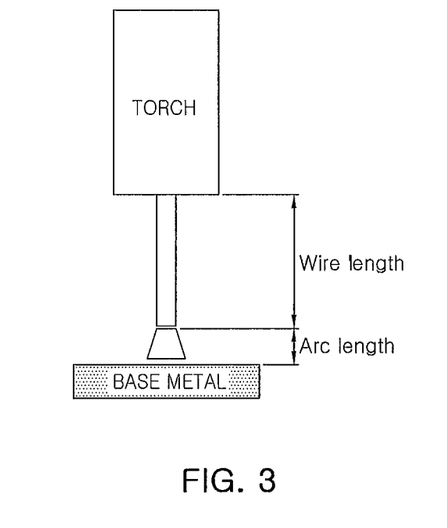
FIG. 3 is a schematic view illustrating a method of flux cored arc welding.

Welding was performed using each flux cored arc welding wire by a welding method as illustrated in FIG. 3. At this time, arc length and wire length of each flux cored arc welding wire were respectively measured 4 times and the results thereof are presented in Table 2. The amount of spatter generated during each welding was measured and the results thereof are presented in Table 5.

TABLE 4

| Category | C | Mn | Si | Ni | B | Ti + TiO$_2$ | Y |
|---|---|---|---|---|---|---|---|
| Inventive Example 1 | 0.02 | 1.32 | 0.41 | 1.2 | 0.014 | 4.2 | 0.12 |
| Inventive Example 2 | 0.04 | 1.42 | 0.52 | 0.42 | 0.03 | 4.51 | 0.42 |
| Inventive Example 3 | 0.06 | 2.31 | 0.82 | 1.23 | 0.06 | 4.3 | 0.07 |
| Inventive Example 4 | 0.07 | 2.06 | 0.99 | 0.02 | 0.011 | 6.38 | 0.12 |
| Inventive Example 5 | 0.05 | 2.02 | 0.64 | 8.06 | 0.0001 | 4.22 | 0.07 |
| Comparative Example 1 | 0.07 | 1.42 | 0.41 | 2.9 | 0.014 | 4.12 | 0 |
| Comparative Example 2 | 0.08 | 2.17 | 1.05 | 0.02 | 0.01 | 6.43 | 0 |
| Comparative Example 3 | 0.06 | 1.96 | 0.52 | 8.23 | 0.0002 | 4.17 | 0 |

TABLE 5

| Category | Wire length (mm) | | | | Arc length (mm) | | | | Amount of spatter generated (mg/min) |
|---|---|---|---|---|---|---|---|---|---|
| Inventive Example 1 | 12.97 | 11.78 | 11.84 | 11.81 | 3.03 | 4.22 | 4.16 | 4.19 | 1.74 |
| Inventive Example 2 | 12.52 | 12.58 | 10.52 | 12.19 | 3.48 | 3.42 | 2.8 | 3.81 | 1.53 |
| Inventive Example 3 | 12.32 | 12.91 | 11.81 | 13.2 | 3.68 | 3.09 | 4.19 | 5.48 | 1.86 |
| Inventive Example 4 | 12.41 | 12.25 | 11.72 | 12.22 | 3.59 | 3.75 | 2.28 | 3.78 | 1.71 |

TABLE 5-continued

| Category | Wire length (mm) | | | | Arc length (mm) | | | | Amount of spatter generated (mg/min) |
|---|---|---|---|---|---|---|---|---|---|
| Inventive Example 5 | 12.91 | 12.55 | 11.84 | 12.47 | 3.09 | 3.45 | 4.16 | 3.53 | 1.66 |
| Comparative Example 1 | 10.74 | 9.63 | 9.85 | 11.05 | 5.26 | 6.37 | 6.15 | 4.95 | 2.42 |
| Comparative Example 2 | 11.63 | 9.11 | 9.6 | 10.99 | 4.37 | 3.89 | 6.4 | 5.01 | 2.68 |
| Comparative Example 3 | 10.96 | 9.66 | 9.54 | 10.67 | 5.04 | 3.34 | 6.46 | 5.33 | 2.33 |

As illustrated in Table 5, it may be understood that arc lengths were decreased in the present inventive examples including Y, and as a result, it may be confirmed that the amounts of spatter generated were reduced.

In contrast, it may be confirmed that arc lengths were increased in the comparative examples not including Y, and the amounts of spatter generated at this time were increased by about 35% to about 40% as compared the inventive examples.

Therefore, it may be understood that since Y is added to the flux cored arc welding wire to reduce the amount of spatter generated, excellent welding workability may be secured.

While the present invention has been shown and described in connection with the exemplary embodiments, it will be apparent to those skilled in the art that modifications and variations can be made without departing from the spirit and scope of the invention as defined by the appended claims.

The invention claimed is:

1. A flux cored arc welding wire comprising:
   0.01 wt % to 0.1 wt % of carbon (C);
   0.3 wt % to 1.4 wt % of silicon (Si);
   1.0 wt % to 3.0 wt % of manganese (Mn);
   4.0 wt % to 7.5 wt % of titanium (Ti)+TiO;
   0.01 wt % to 3.0 wt % of nickel (Ni);
   0.01 wt % to 0.2 wt % of boron (B);
   0.02 wt % to 0.42 wt % of yttrium (Y) and 0.02 wt % to 0.56 wt % of another rare earth metal (REM); and
   iron (Fe) as well as other unavoidable impurities as a remainder,
   wherein a sum of Y and the other REM is in a range of 0.19 wt % to 0.65 wt %.

2. The flux cored arc welding wire of claim 1, further comprising 0.15 wt % or less of niobium (Nb).

3. The flux cored arc welding wire of claim 1, wherein an amount of spatter generated during arc welding with the welding wire under welding conditions of 280A-30V is 2.0 mg/min or less.

4. A weld joint having excellent workability and able to secure low-temperature toughness comprising:
   0.01 wt % to 0.1 wt % of C;
   0.1 wt % to 0.5 wt % of Si;
   0.5 wt % to 2.0 wt % of Mn;
   0.02 wt % to 0.1 wt % of Ti;
   0.01 wt % to 3.0 wt % of Ni;
   5 ppm to 60 ppm of B;
   one or two of 5 ppm to 250 ppm of Y and 5 ppm to 250 ppm of a REM; and
   Fe as well as other unavoidable impurities as a remainder,
   wherein the weld joint has a prior austenite grain diameter of 400 μm or less.

5. The weld joint having excellent workability and able to secure low-temperature toughness of claim 4, further comprising 0.02 wt % or less of Nb.

6. The weld joint having excellent workability and able to secure low-temperature toughness of claim 4, wherein the weld joint comprises complex inclusions formed of one or more of Ti, Mn, Y, and REM, and
   an amount of complex inclusions having an average diameter ranging from 0.01 μm to 0.1 μm is 65% or less of total complex inclusions.

7. The weld joint having excellent workability and able to secure low-temperature toughness of claim 6, wherein the number of complex inclusions is 200 or more per 1 mm².

8. The weld joint having excellent workability and able to secure low-temperature toughness of claim 4, wherein an area fraction of acicular ferrite in a microstructure of the weld joint is 86% or more.

9. The weld joint having excellent workability and able to secure low-temperature toughness of claim 4, wherein a low-temperature impact toughness of the weld joint at −80° C. is 60 J or more.

10. The weld joint having excellent workability and able to secure low-temperature toughness of claim 3, wherein a low-temperature crack tip opening displacement (CTOD) value of the weld joint at −60° C. is 0.25 mm or more.

* * * * *